US010339060B2

(12) United States Patent
Fahim et al.

(10) Patent No.: US 10,339,060 B2
(45) Date of Patent: Jul. 2, 2019

(54) OPTIMIZED CACHING AGENT WITH INTEGRATED DIRECTORY CACHE

(71) Applicant: Intel Corporation, Santa Clara, CA (US)

(72) Inventors: Bahaa Fahim, Santa Clara, CA (US); Ashok Jagannathan, Bangalore (IN); Jeffrey D. Chamberlain, Tracy, CA (US); Samuel D. Strom, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 15/396,174

(22) Filed: Dec. 30, 2016

(65) Prior Publication Data

US 2018/0189180 A1 Jul. 5, 2018

(51) Int. Cl.
*G06F 12/0817* (2016.01)
*G06F 12/0831* (2016.01)

(52) U.S. Cl.
CPC ...... *G06F 12/0833* (2013.01); *G06F 12/0824* (2013.01); *G06F 2212/1024* (2013.01); *G06F 2212/1041* (2013.01)

(58) Field of Classification Search
None
See application file for complete search history.

(56) References Cited

U.S. PATENT DOCUMENTS

| | | | | |
|---|---|---|---|---|
| 8,375,171 | B2 * | 2/2013 | Heine | G06F 12/084 711/141 |
| 10,198,357 | B2 * | 2/2019 | Hur | G06F 12/0833 |
| 2004/0003184 | A1 * | 1/2004 | Safranek | G06F 12/082 711/146 |
| 2006/0080511 | A1 * | 4/2006 | Hoover | G06F 12/0828 711/141 |
| 2007/0073977 | A1 * | 3/2007 | Safranek | G06F 12/0835 711/141 |
| 2008/0005485 | A1 * | 1/2008 | Gilbert | G06F 12/0833 711/146 |
| 2015/0127907 | A1 * | 5/2015 | Fahim | G06F 12/0813 711/120 |
| 2017/0185515 | A1 * | 6/2017 | Fahim | G06F 12/0815 |
| 2017/0255557 | A1 * | 9/2017 | Robinson | G06F 12/0831 |
| 2018/0089083 | A1 * | 3/2018 | Deshpande | G06F 12/0831 |

* cited by examiner

*Primary Examiner* — Edward J Dudek, Jr.
*Assistant Examiner* — Ralph A Verderamo, III
(74) *Attorney, Agent, or Firm* — Nicholson De Vos Webster & Elliott LLP

(57) ABSTRACT

System, method, and processor for enabling early deallocation of tracker entries which track memory accesses are described herein. One embodiment of a method includes: maintaining an RSF corresponding to a first processing unit of a plurality of processing units to track cache lines, wherein a cache line is tracked by the RSF if the cache line is stored in both a memory and one or more other processing unit, the memory is coupled to and shared by the plurality of processing units; receiving a request to access a target cache line from a processing core of the first processing unit; allocating a tracker entry corresponding to the request, the tracker entry used to track a status of the request; performing a lookup in the RSF for the target cache line; and deallocating the tracker entry responsive to a detection that the target cache line is not tracked the RSF.

25 Claims, 17 Drawing Sheets

OPTIMIZED CACHING AGENT WITH INTEGRATED DIRECTORY CACHE

BACKGROUND INFORMATION

Many challenges exit in the development of new and improved solutions to address the ever increasing processing demands in current, as well as future, server/computer usage models. One of these challenges is the perceived "memory wall" where memory bandwidth is unable to keep up with the rising compute bandwidth. For highly parallel applications, it is relatively simple to increase the compute bandwidth and efficiency by increasing the number of cores used and/or offloading certain tasks to highly specialized cores. However, these approaches do not scale well when it comes to increasing the memory bandwidth because designing a coherent interconnect and memory hierarchy that is able to keep up with the ever increasing compute bandwidth poses several challenges.

First, increasing the computing cores puts pressure on overall die size. Many of the current high performance computing (HPC) and integrated Graphics central processing unit (CPU) designs are either already at the reticle limit or unable to increase die size due to cost constraints. This leaves very little on-die physical space available for implementing the coherent interconnect buffers and queues necessary to support an increase in memory bandwidth. Second, many of the current CPU designs are already significantly power-challenged as they are. Couple that with a strong desire to allocate more power to the compute elements rather than to the fabric, it is evident that the key to increase memory bandwidth lies in the smarter and more efficient use of existing memory resources in current architecture designs rather than trying to create more of them.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
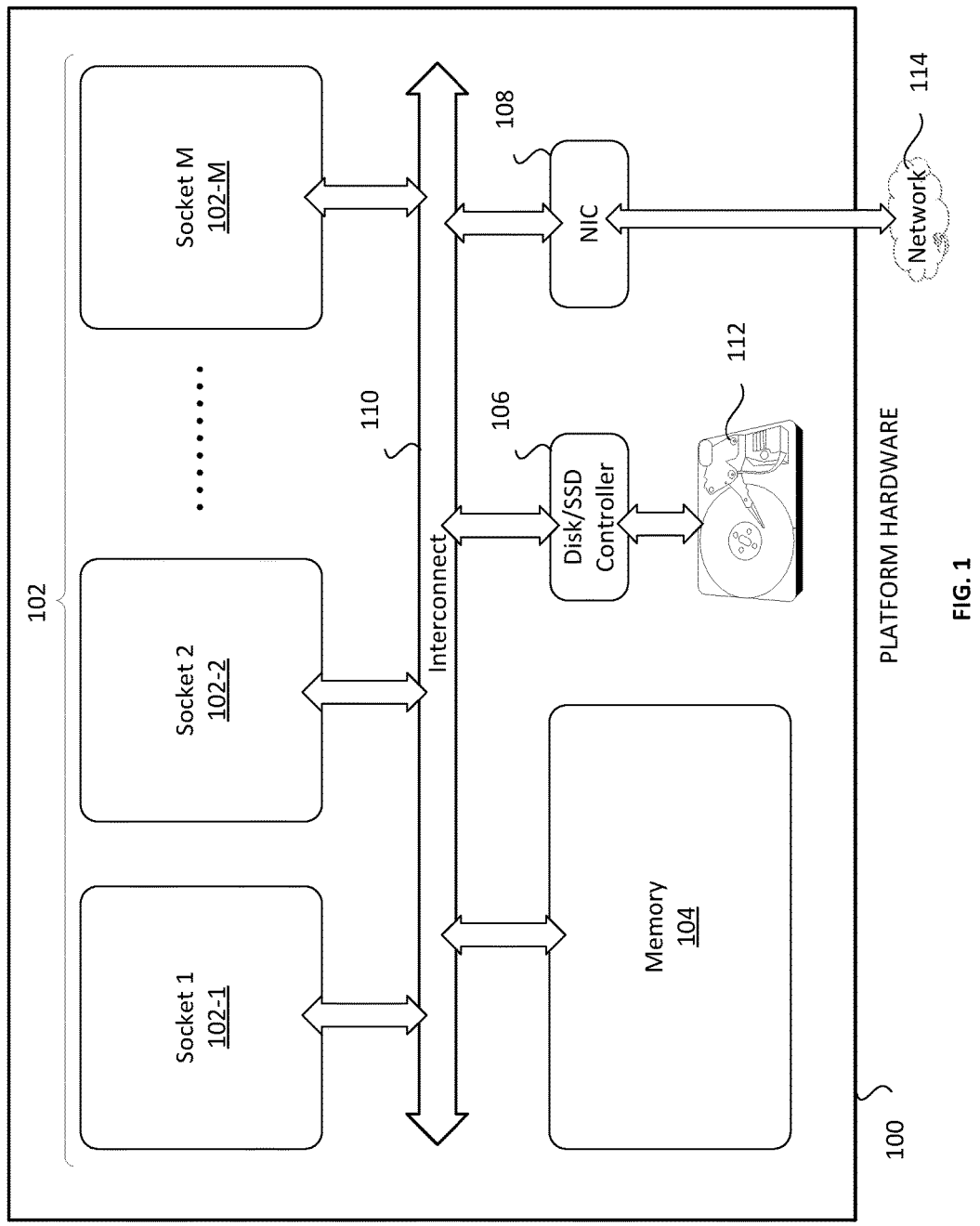
FIG. 1 is a block diagram illustrating a high-level view of an exemplary platform hardware or system for implementing embodiments of the present invention.

Embodiments of system, method, and processor implementing a remote snoop filter for enabling early deallocation of tracker entries in table of requests (TOR) used to track memory accesses is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

One of the key challenges with scaling the coherent fabric to match up with the memory bandwidth increase is the caching agent (CHA) tracker entries. These CHA tracker entries are allocated for every outstanding request made by any caching agent to track the progress of each request. Increasing the memory bandwidth means more requests are being processed and thus more tracker entries are needed. Typically, increasing the number of tracker entries to support additional memory bandwidth requires either increasing the number of caching agents or increasing the number of tracker entries for each caching agent. However, neither solution is ideal because of the associated area, power, and timing convergence challenges. For example, increasing the number of caching agent means expanding the overall die size and consuming more power. The same applies to increasing the number of tracker entries per caching agent, along with other issues relating to the frequency and timing of the entries. Thus, neither solution is ideal for high memory bandwidth applications.

In order to support higher memory bandwidth without substantially increasing the number of tracker entries, a mechanism to reduce the tracker entry lifetime is described herein. Generally, coherence tracker entries are allocated when memory access requests (e.g., reading a cache line memory) are received and these entries need to remain outstanding until the associated access request is completed. The reason being that the response from the memory typically includes directory state information that are used for determining whether cross-socket snoops are required. For instance, if a cache line that is read from memory is also cached in one or more remote sockets, those remote sockets should be snooped to ensure memory coherence such that the most current copy of the cache line is being returned. With that said, many applications today are specifically designed with a bias towards local memory and thus the data stored and used are not usually shared across sockets. As such, these applications often times do not require cross-socket snoops to ensure memory coherence. However, there is currently no mechanism for the caching agents to predict or determine prior to a memory read whether or not the requested cache line is shared across sockets. Thus, tracker entries are necessarily used and maintained for at least the duration of the memory read. This is often longer than necessary, especially in scenarios involving applications designed with a specific bias towards local memory. One aspect of the present invention enables the caching agents to reduce the lifetime of tracker entries with advance knowledge on whether a requested cache line is shared across sockets. This advance knowledge will allow some tracker entries to be deallocated or terminated early without having to wait on the response from memory, thus freeing up these tracker entries for other requests. All in all, the early detection and termination of tracker entries provide a more efficient usage of memory resources and allow support of higher memory bandwidth without significant increases to the area and power overhead.

FIG. 1 is a block diagram illustrating a high-level view of an exemplary platform hardware or system for implementing embodiments of the present invention. Platform hardware 100 includes sockets 1 through M 102, memory 104, disk and/or solid state drive (SSD) controller 106, and network interface card (NIC) 108. The sockets (102-1 through 102-M), memory, 104, disk/SSD controller 105, and NIC 108 are coupled through a high-speed interconnect 110. The interconnect 110 may be a bus or point to point interconnect, as well other suitable connection fabric or technology, such as the QuickPath Interconnect (QPI) developed by Intel® Corporation of Santa Clara, Calif. The disk/SSD controller 106 is connected to storage disks such as disk drives, SSDs, CD/DVD-Rom, etc. The NIC 108 is connected to the network 114. According to embodiments of the present invention, sockets 1 through M 102 may contain or include a system on chip (SoC) such as a central processing unit (CPU), graphics processing unit (GPU), field programmable gateway array (FPGA), etc. The SoC may further include one or more processor cores. The sockets may be implemented all on the same package, or alternatively, the sockets may be implemented on different packages depending on the hardware configuration choice. Platform hardware 100 may also include other components that are not shown to avoid obscuring and/or complicating the underlying aspects of the present invention.

Figure 2A:
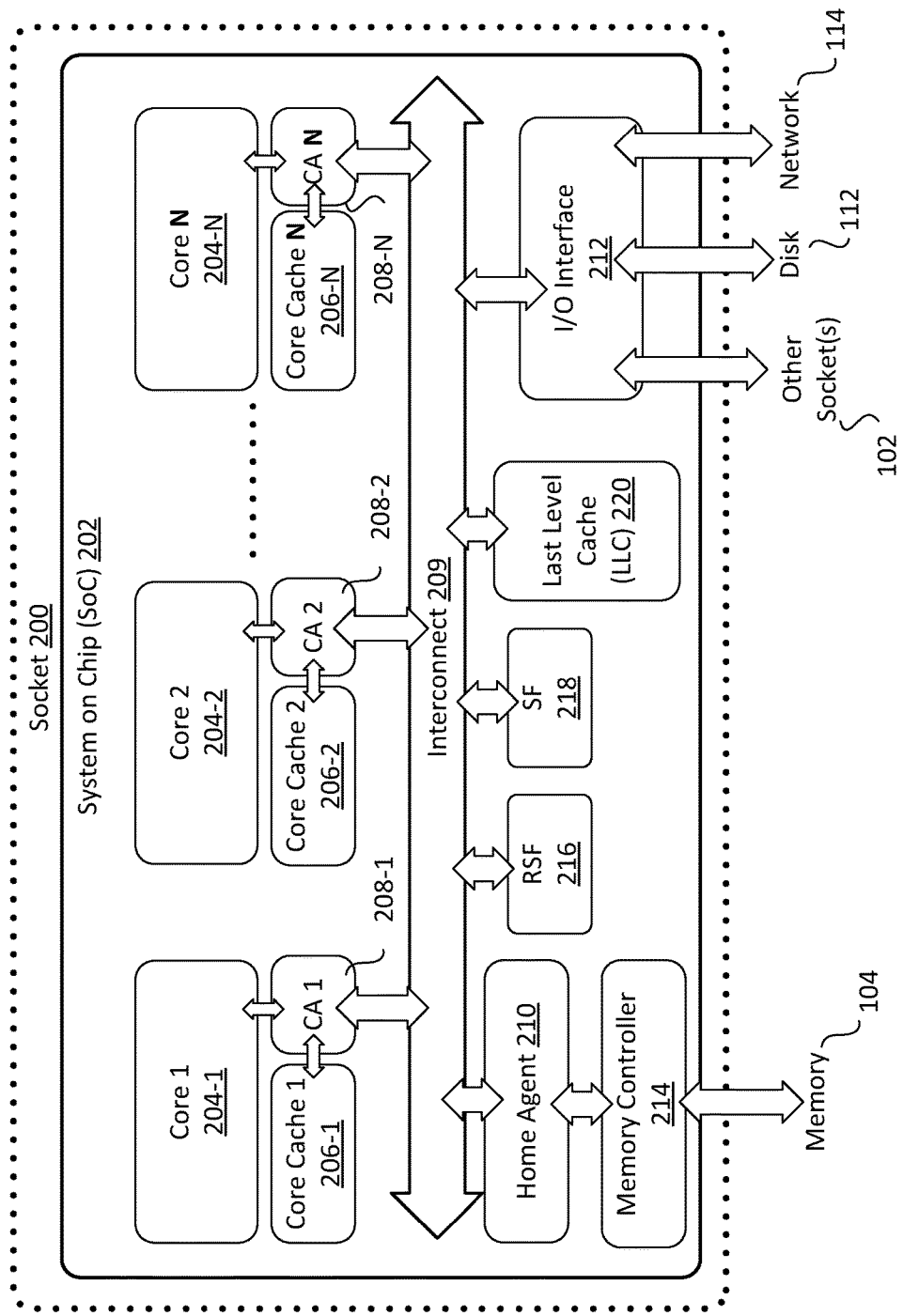
FIG. 2A is a block diagram illustrating a socket according to an embodiment.

FIG. 2A is a block diagram illustrating a socket according to an embodiment. The socket may be one of sockets 1 through M from FIG. 1. According to one embodiment, socket 200 includes processing unit such as a system on chip (SoC) 202. In FIG. 2, the SoC 202 is a multi-core processor that includes processor cores 1-N 204-1-204-N. Each of the processor cores includes one or more respective core caches (e.g., 206) for caching instructions and data according to a specified cache management policy. Each core (e.g., 204-1) interfaces with its core cache (e.g., 206-1) through a corresponding cache agent (e.g., 208-1) The SoC 202 further includes a home agent 210, input/output (I/O) interface 212, memory controller 214, and level 3 or last level cache (LLC) 220. The processor cores 1 through N 204-1-204-N, LLC 220, memory controller 214, and I/O interface 212 are coupled through interconnect 209. According to an embodiment, the cores and caches are connected to the interconnect through their respective agents. The memory controller 214 interfaces with interconnect through the home agent 210. The memory controller 214 provides connection between the SoC 202 to the system memory or main memory, such as memory 104 of FIG. 1. The system or main memory associated with a socket may also be referred to as the local memory of the socket. The I/O interface 212 connects the SoC 202 to other sockets (e.g., 102), disks (e.g., 112), and/or networks (e.g., 114) through their respective controllers.

In one embodiment, a remote snoop filter (RSF) 216 and a snoop filter (SF) 218 are implemented and maintained by the home agent 210. The RSF 216 stores the address and state of cache lines that are cached in both the memory 104 and the cache of another socket (e.g., 102-2). The RSF 110 may be implemented as a fully associative array or as any other suitable data structure.

While FIG. 2A shows only one core cache for each of the processor cores 1 through N, each processor core may include any number of core caches. In some embodiments, the number of core caches may vary between the various processor cores such that one core may have more core cache than another core. According to an embodiment, each processor core includes a single level 1 (L1) cache. In another embodiment, the processor core includes an L1 cache as well as level 2 (L2) cache. Each of the core cache (e.g., 206) is associated with a corresponding cache agent (e.g., 208). The cache agent manages the interface between the core (e.g., 204), the core cache (e.g., 206), and the LLC 220. All core transactions that accesses the LLC are directed from the core to a caching agent. The caching agent is responsible for managing data delivery from the LLC to the requesting core. It is also responsible for maintaining coherency between the cores within the socket 200 that share the LLC, as well as generating snoops and collecting snoop responses from local cores. In contrast, the home agent 210 is responsible for interfacing with the memory controller, ensuring memory/cache coherency, broadcast snoops to peer caching agents in other sockets, as well as maintaining a memory directory. The caching agents and the home agent are connected by an on-die high-speed interconnect. The caching agent and the home agent may sometimes be collectively referred to as Caching/Home Agent ("CHA"). According to an embodiment, the cache agent, home agent, and/or the CHA are implemented as hardware including circuitry to read from and write to a cache memory.

Figure 2B:
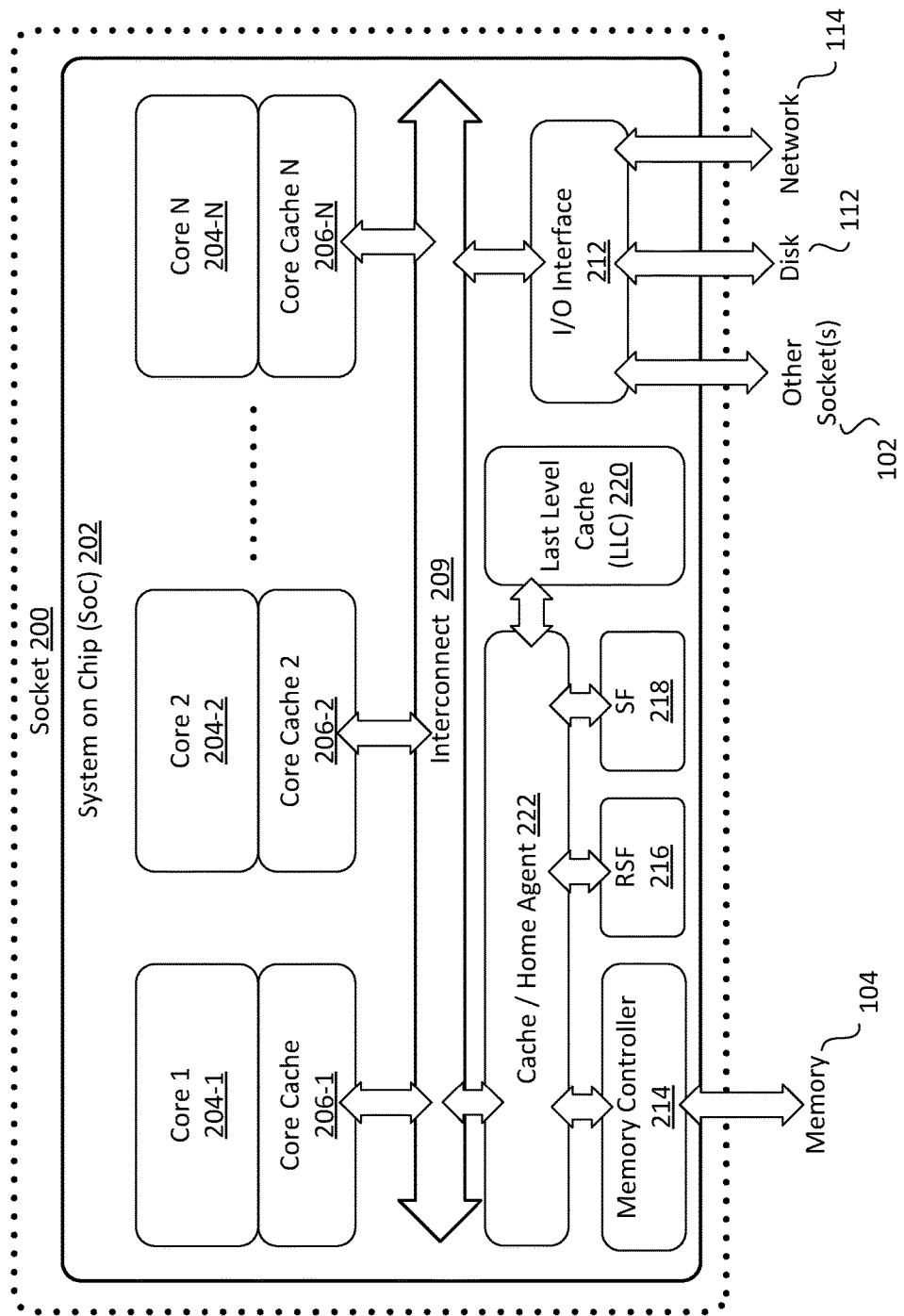
FIG. 2B is a block diagram illustrating an alternate embodiment of a socket.

FIG. 2B is a block diagram illustrating an alternate embodiment of a socket similar to that of FIG. 2A. The difference being that the cache agents 208-1 through 208-N and the home agent 210 of FIG. 2A are combined in FIG. 2B as Cache/Home Agent (CHA) 222.

Figure 3:
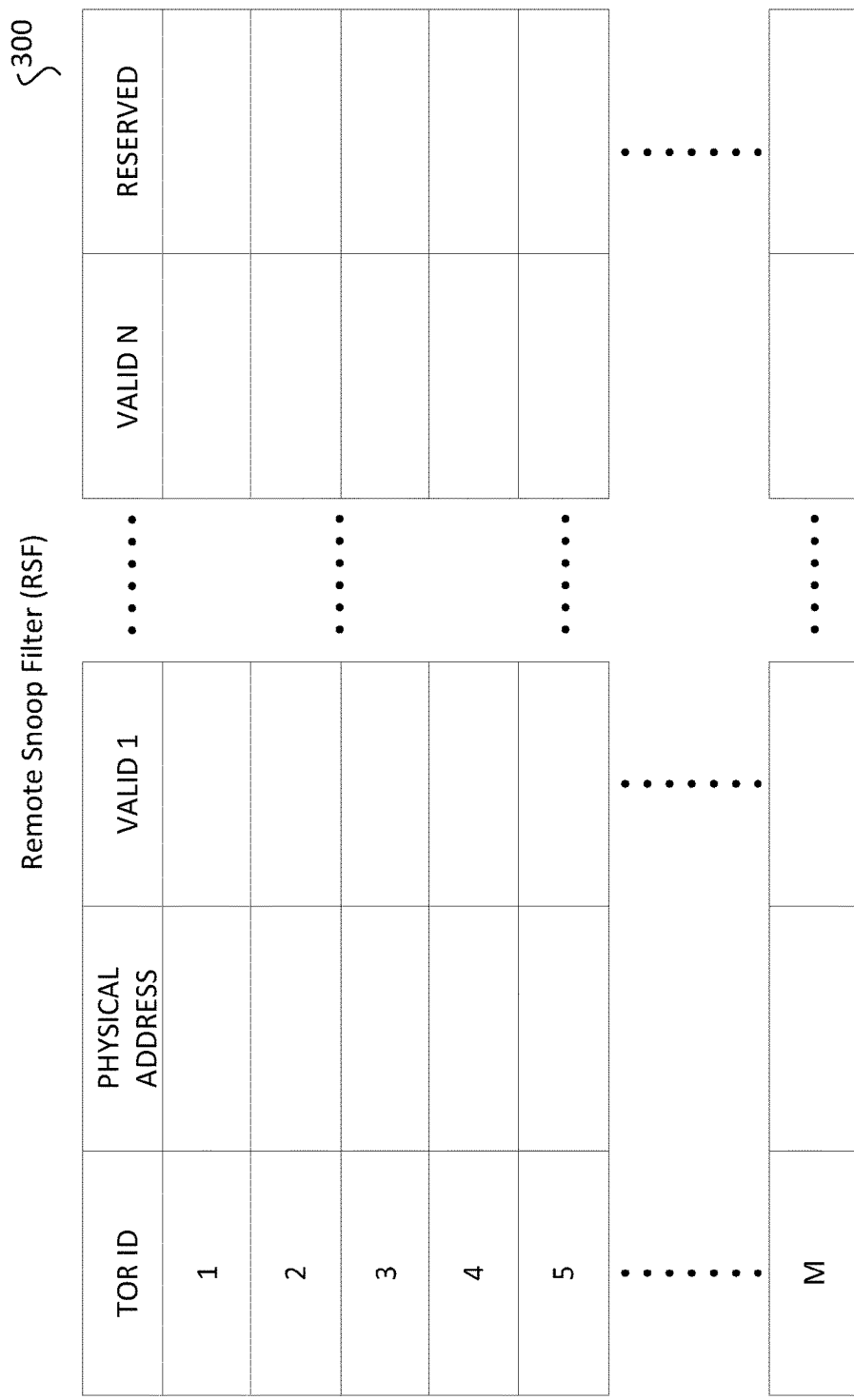
FIG. 3 illustrates an exemplary implementation of a remote snoop filter ("RSF") according to an embodiment of the present invention.

FIG. 3 illustrates an exemplary implementation of the RSF according to an embodiment of the present invention. The RSF is used to track the address and state of all cache lines that are present in the local memory as well as cached in at least one remote socket. According to an embodiment, the RSF is implemented as hardware such as a physical memory structure including a number of entries, each entry having a number of fields. In at least some embodiments, the size of the RSF is based on the size of the local memory and/or the cache of the remote socket. In FIG. 3, the RSF 300 includes M entries (i.e., TOR ID 1-M). For each cache line that is present in the local memory as well as the cache of at least one remote socket, regardless of the state, an entry corresponding to the cache line exists in the RSF. Each RSF entry comprises a physical address field, a RESERVED bit, and one or more VALID bits. The physical address field stores the physical address of the cache line tracked by the entry. The RESERVED bit is used to control access to the entry. For instance, according to an embodiment, a RESERVED bit of an entry is set to true, which lock up the entry, if the entry is currently being accessed or modified by a pending request, so to prevent collision. The VALID bits are used to indicate which of the remote sockets have a copy of the cache line tracked by the entry. Each valid bit corresponds to a remote socket and thus the number of VALID bits used in the entry equals the number of remote sockets present in the system. In FIG. 3, each RSF entry contains N VALID bits (i.e., VALID 1 through VALID N) which indicates that there are N remote sockets in the system. A cache line that is present in local memory and cached in the cache of at least one remote socket, regardless of state, is tracked by a corresponding entry in the RSF. A cache line not found in the RSF is presumed to not be in any of the remote sockets in the system. The result from a RSF lookup (i.e. hit or miss) is used by the CHA to determine whether or not remote sockets should be snooped. Unlike a memory read, which can have nondeterministic response time depending on the state of the memory, the response time for a RSF lookup is deterministic and typically shorter than that from a memory read. Thus, the use of an RSF provides a more efficient way for tracking cache lines in remote sockets. Moreover, the RSF is an independent structure and does not interact with any of the local coherence flows, making it severable in a modular SoC design.

Figure 4:
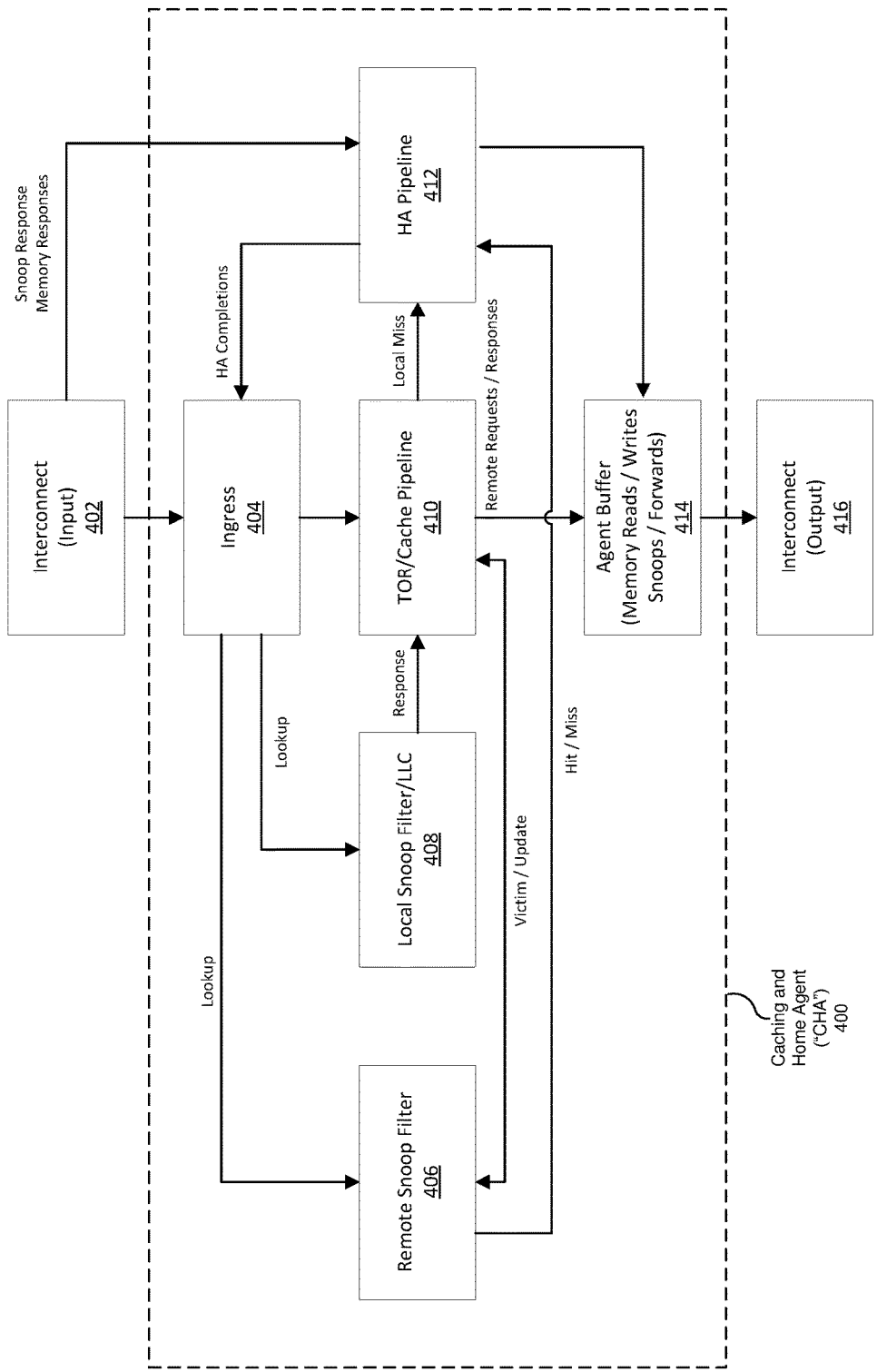
FIG. 4 is a block diagram illustrating an abstracted high-level view of a cache and home agent ("CHA") implementation according to one embodiment.

FIG. 4 is a block diagram illustrating an abstracted high-level view of a CHA implementation according to one embodiment. This is only intended to show a high-level workflow. The detailed operations and logic of the CHA and the RSF will be further explained below in FIG. 5. Referring to FIG. 4, the Interconnect (Input) 402 and Interconnect (Output) 416 connects the CHA to local cores, remote sockets (e.g., CPU, GPU, FPGA, etc.), and system memory. The interconnect may be any suitable high-speed on-die connection such as ring, mesh, crossbar, point-to-point, etc. An ingress mechanism or logic 404 receives and processes a cache line request coming in through the Interconnect (Input) 402 to access a target cache line. The cache line request is looked up in the RSF 406 to determine if the target cache line is cached in any of the remote sockets in the system. The hit/miss result from the RSF lookup is sent to the HA pipeline 412. The HA pipeline 412 deals with read and write requests that need to be send to memory. It also uses the memory directory state and/or the result from the RSF lookup to determining if additional sockets in the system need to be snooped. The hit/miss result from the RSF may also trigger a victim/update mechanism if a cache line request needs to be allocated into the RSF by evicting an existing entry in the RSF. The victim/update mechanism processes the evicted entry and enters the appropriate requests into the TOR (Table of Requests)/Cache Pipeline 410.

In parallel to looking up the cache line request in the RSF, a lookup is also performed in the Snoop Filter and Last Level Cache 408. The Snoop Filter and Last Level Cache 408 is a directory for indicating what is being cached in the local caches such as the L1 cache, L2 cache, and LLC. It is used for maintaining local cache coherency. The hit/miss result of this look up is fed into the TOR/Cache Pipeline 410 and processed to generate an appropriate response. The response may include responding to the requesting core with the cache line or notifying the HA pipeline about a local miss. The response generated from TOR/Cache Pipeline 410 and HA Pipeline are queue in the Agent Buffer 414 before outputting to the Interconnect 416.

According to an embodiment of the present invention, tracker entries in the TOR/Cache Pipeline 410 may be terminated or deallocated early, and thus free up resources in the TOR/cache Pipeline 410, if it is determined from the RSF lookup that no remote socket needs to be snooped (i.e., an RSF miss). Since cache line request seeking to access a cache line that is not cached in remote sockets will always be fulfilled by a memory read, it would be unnecessary to maintain a tracker entry in the TOR for tracking the status of the request. Moreover, as noted above, the response from an RSF lookup typically occurs faster than the response from a memory read, tracker entries can thus be terminated based on the RSF lookup without having to wait for a response from the memory read. This shortens the duration of the lifespan of unnecessary tracker entries. For cache line request that do require snooping of one or more remote sockets, as indicated by the results of an RSF lookup (i.e., an RSF hit), the corresponding tracker entry is maintained by the CHA until a remote snoop response is received and the cache line request fulfilled. This is the same duration that a tracker entry would normally be maintained by the CHA without the implementation of an RSF.

Figure 5:
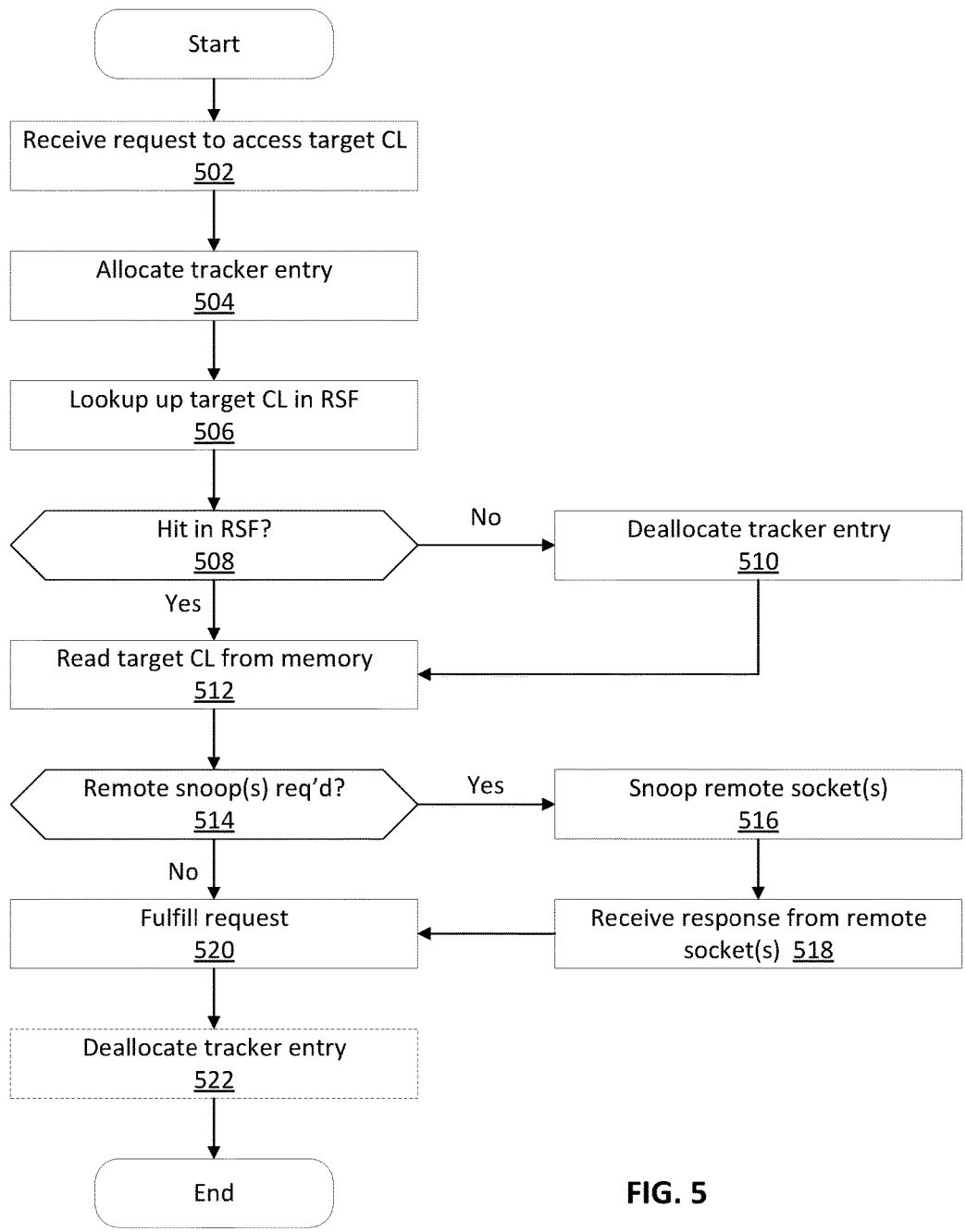
FIG. 5 is a flow chart illustrating the operations and logic for implementing a CHA to perform early deallocation of tracker entries according to an embodiment.

FIG. 5 is a flow chart illustrating the operations and logic for implementing a CHA to perform early deallocation of tracker entries according to an embodiment. At 502, the CHA (e.g., 222 of FIG. 2B) receives a request to access a target cache line. The request may be from, for example, a local core (e.g., 204 of FIGS. 2A/B) as the result of a local cache miss. Next, at 504, a tracker entry is allocated by the CHA. In one embodiment, a tracker entry corresponding to the request is created in the TOR for tracking the status of the request. At 506, the CHA performs a lookup in the RSF maintained by the CHA to search for an entry corresponding to the target cache line. The RSF lookup may be performed in parallel to other lookups for the target cache line, such as lookups in the local snoop filter (e.g., 218) and the LLC (e.g., 220), which are not illustrated in FIG. 5. At 508, the CHA determines if the target cache line matches any of the entries in the RSF. A miss in the RSF indicates that the requested target cache line is not cached in any of the remote sockets in the system. If this is the case, the tracker entry in the TOR corresponding to the request is deallocated at 510. The tracker may be deallocated here because since no snooping of remote sockets is necessary, the request will be fulfilled via the target cache line read from local memory, it would be unnecessary to keep the tracker entry to track status of the request. In one embodiment, deallocating the tracker entry means deleting the tracker entry corresponding to the request from the TOR. On the other hand, if a match or a hit was found in the RSF at 508, indicating that the requested target cache line is present in at least one remote socket in the system, then the tracker entry is not deallocated in the TOR.

Irrespective of the results from the RSF lookup (i.e., hit or miss), a read to local memory for the target cache line is performed at 512. While FIG. 5 shows that the read to local memory is performed after the RSF lookup, in some embodiments, the RSF lookup and the memory read may be performed in parallel or within a short time of each other, as there is no dependency between the two. The timing and order of the RSF lookup and memory read are not critical to the underlying invention. At 514, a determination is made on whether remote sockets should be snooped via remote snoop request. This determination may be made in several ways. For instance, if the RSF lookup for the target cache line back at 508 resulted in a miss, which indicates the target cache line is not cached in any of the remote sockets, then no remote sockets should be snooped. On the other hand, if the RSF lookup for the target cache line resulted in a hit, indicating that the target cache line is cached in at least one of the remote sockets, then one or more remote sockets should be snooped based on the information provided by the RSF (e.g., based the VALID bit). Moreover, the directory state of the cache line from the memory read may also checked to determine whether remote sockets should be snooped. If no snooping of remote sockets is required, the CHA fulfills or responds to the request at 520 using target cache line read from the local memory. If one or more remote sockets need to be snooped, then a remote snoop is issued at 516. At 518, the response to the remote snoop is received from the remote socket. At 520, the request is fulfilled based on the response from the remote snoop. After the request is fulfilled, the tracker entry is deallocated at 522. The deallocation of tracker entry at 522 is optional because if the tracker entry was already previously deallocated at 510 based on the results from the RSF lookup (i.e., an RSF miss), then the tracker entry would not need to be deallocated again.

Figure 6:
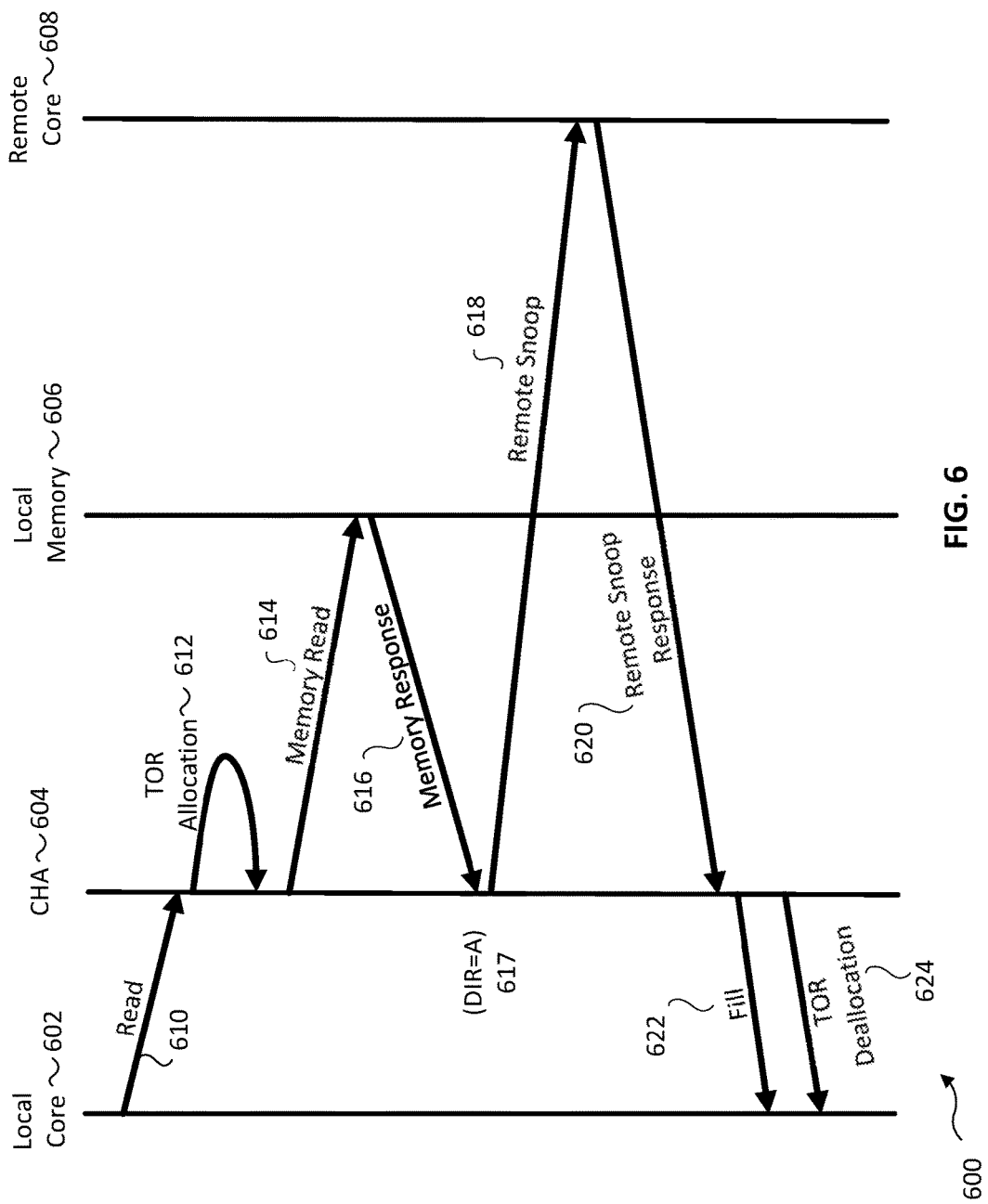
FIG. 6 is a message flow diagram, based on prior art, illustrating a cache line access by a local core in which snooping of remote sockets is required.

FIG. 6 is a message flow diagram, based on prior art, illustrating a cache line access by a local core in which snooping of remote sockets is required. The message flow diagram 600 implemented on a hardware platform or system comprises a local core 602, a CHA 604, a local memory 606 and a remote core 608. The local core 602 and remote core 608 reside in different sockets in the system. For example, the local core 602 may reside in socket 1 102-1 of FIG. 1 while the remote core 608 resides in socket M 1002-2. Initially, the local core 602 sends to the CHA 604 a request, such as read request 610, to access a target cache line. Responsive to the request, the CHA 604 allocates, via TOR allocation message 612, a tracker entry in the TOR to track the status of the request. Next, the CHA 604 initiates a memory read 614 to the local memory 606 to access the target cache line stored therein. In response to the read, local memory 606 returns the target cache line to the CHA 604 via a memory response 616. Upon receiving the target cache line in the memory response 616, the CHA 604 checks the directory state of the target cache line to determine whether the cores on remote sockets need to be snooped to maintain memory coherency. In this case, the directory state (i.e., DIR=A) 617 indicates that remote snoop is required. As such, CHA 604 dispatches remote snoop 618 to remote core 608 on a remote socket for the target cache line. It is noted that more than one remote core may be snooped. The snooped remote core 608 then returns its copy of the target cache line to the CHA 604 in a remote snoop response message 620. Upon receiving the target cache line in the remote snoop response, the CHA 604 responds to the initial request 610 by sending the received target cache line in message 622 back to local core 602. Simultaneously or shortly thereafter, the CHA 604 deallocates the tracker entry in the TOR via TOR deallocation message 624.

Figure 7:
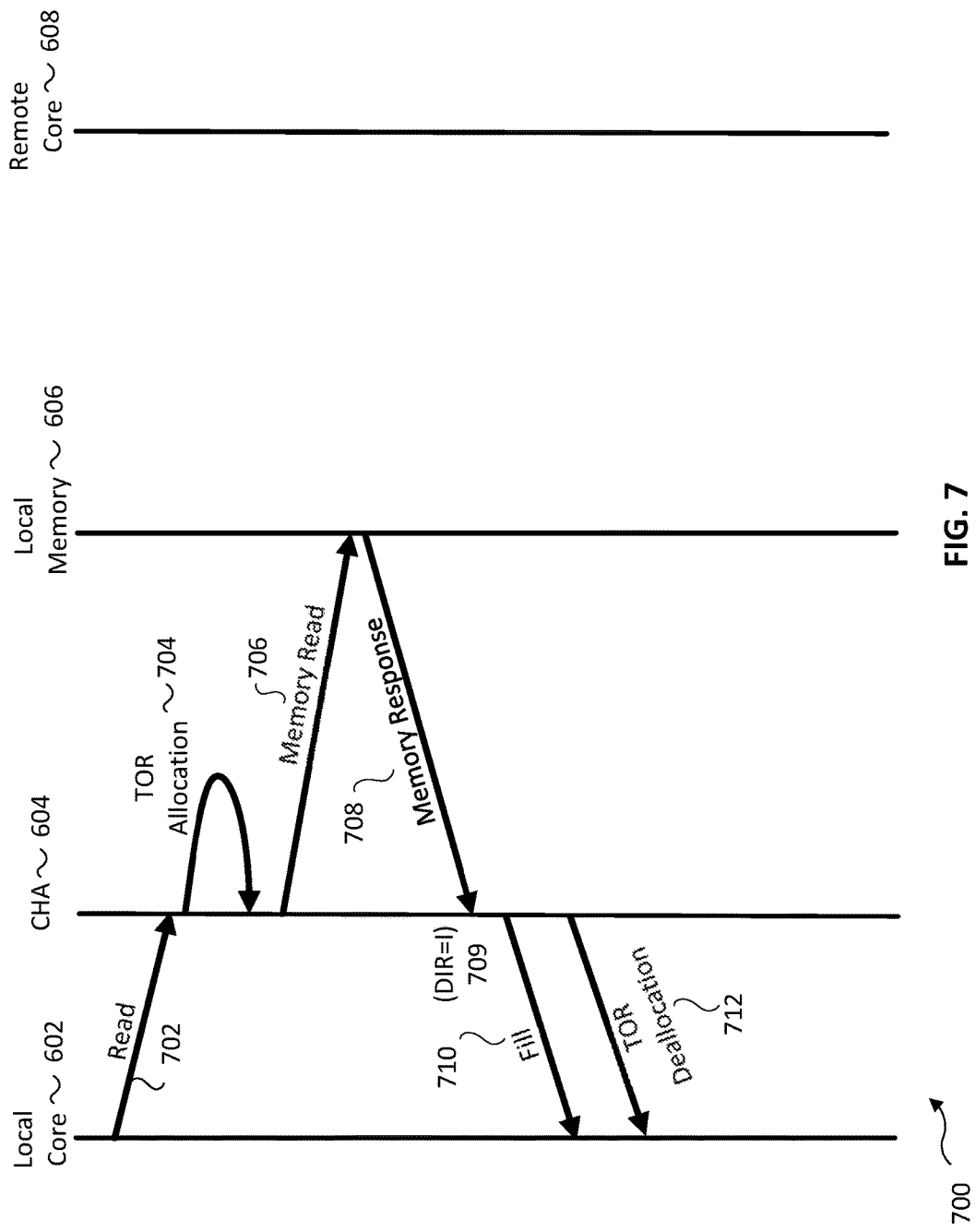
FIG. 7 shows a message flow diagram corresponding to a cache line access request originating from local core in which snooping of remote sockets is not required.

FIG. 7 shows a message flow diagram 700 corresponding to a similar cache line access request originating from local core 602 in which snooping of remote sockets is not required. Initially, the local core 602 sends to the CHA 604 a request, such as read request 702, to access a target cache line. Responsive to the request, the CHA 604 allocates a tracker entry in the TOR to track the status of the request through TOR allocation message 704. Next, the CHA 604 initiates a memory read 706 to the local memory 606 to access the target cache line stored therein. In response to the read, local memory 606 returns the target cache line to the CHA 604 via memory response 708. Upon receiving the target cache line in the memory response 708, the CHA 604 checks the directory state of the target cache line to determine whether the cores on any of the remote sockets need to be snooped in order to maintain memory coherency. In this case, the directory state (i.e., DIR=I) 709 indicates that a remote snoop is not required. As such, the CHA 604 responds to the initial request with the target cache line received in the memory response 708 by sending the received target cache line to the local core 602 via message 710. Simultaneously or shortly thereafter, the CHA 604 deallocates the tracker entry in the TOR with TOR deallocation message 712.

Figure 8:
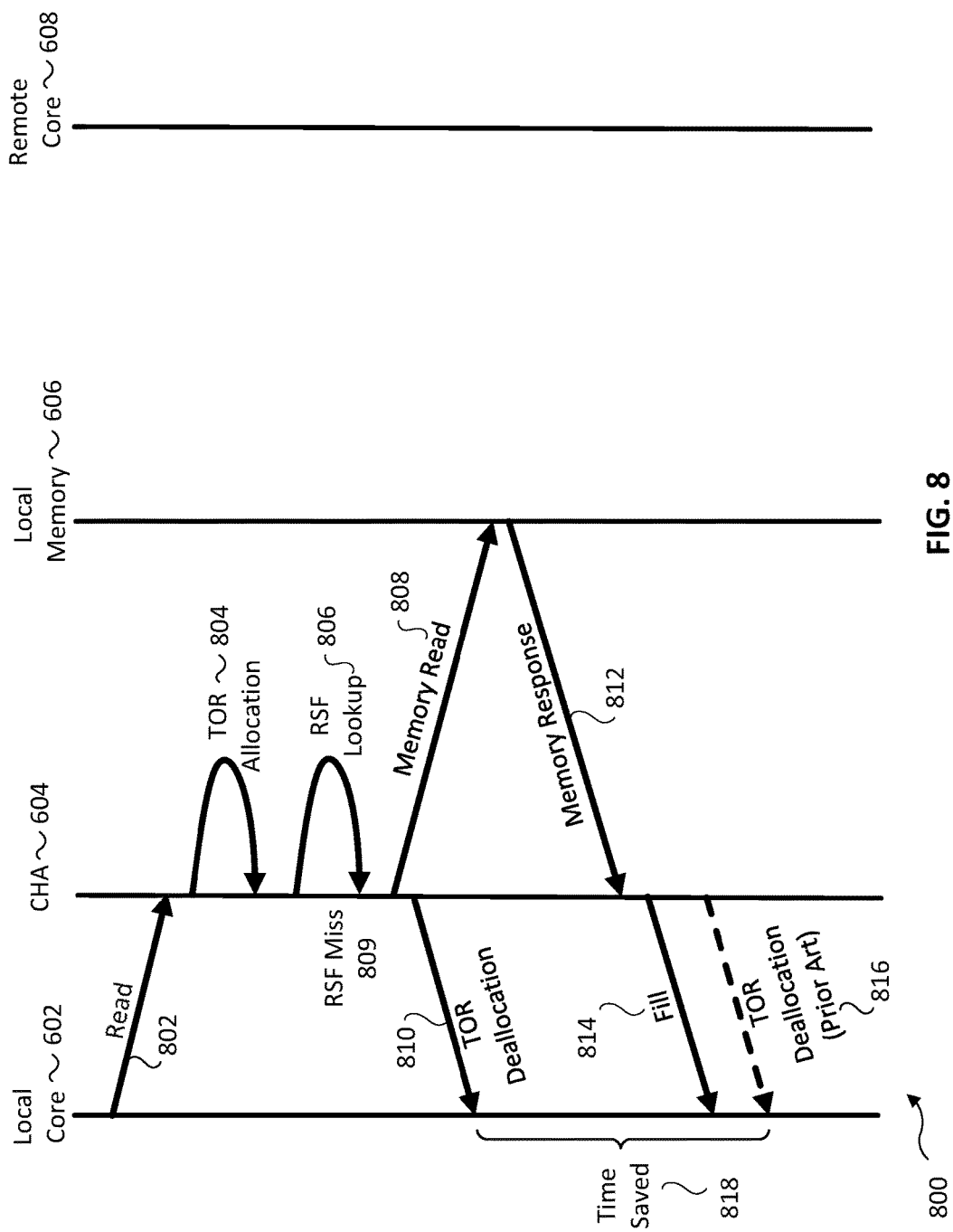
FIG. 8 illustrates a message flow diagram corresponding to a cache line access request originating from local core in which the tracker entry in the table of requests ("TOR") is deallocated early according to an embodiment of the present invention.

FIG. 8 illustrates a message flow diagram 800 corresponding to a cache line access request originating from local core 602 in which the tracker entry in the TOR is deallocated early according to an embodiment of the present invention. Initially, the local core 602 sends to the CHA 604 a request, such as read request 802, to access a target cache line. Responsive to receiving the request, the CHA 604 allocates a tracker entry in the TOR to track the status of the request with TOR allocation message 804. Next the CHA 604 performs a RSF lookup 806 to search for an entry matching the target cache line. In this case, the RSF lookup results in RSF miss 809 which indicates that the target cache line is not cached in the remote socket 608. Responsive to the RSF miss, the CHA 604 deallocates the tracker entry in the TOR via TOR deallocation message 810. Next, the CHA 604 dispatches a memory read message 808 to the local memory 606 to access the target cache line stored therein. In one embodiment, the memory read occurs after the RSF lookup. In other embodiments, the memory read is performed in parallel to the RSF lookup. As noted above, the timing and order between the RSF lookup and memory read are not critical to the underlying invention.

In response to the memory read, local memory 606 returns the target cache line to the CHA 604 via a memory response 812. Upon receiving the target cache line in memory response 812, the CHA 604 responds to the initial request with the target cache line received in the memory response 812, by sending the received target cache line in a message 814 back to the local core 602. According to one embodiment, it is not necessary for the CHA 604 to check the directory state of the target cache line received in memory response 812 to determine whether cores on remote sockets should be snooped. This is because the result from RSF lookup (i.e., RSF miss 809) has already indicated that remote snoop is not required.

Normally, according to prior art, after CHA 604 fulfills the initial read request 802 via message 814, the tracker entry in the TOR would be deallocated via TOR deallocation message 816. However, since the tracker entry was already previously deallocated based on the RSF miss 809 from the RSF lookup, there would be no tracker entry corresponding to the read request 802 for CHA 604 to deallocate. The early deallocation of the tracker entry, as made possible by aspects of the present invention, frees up TOR resources for performing other tasks. The time saved between early tracker entry deallocation and late tracker entry deallocation is indicated by 818.

Figure 9:
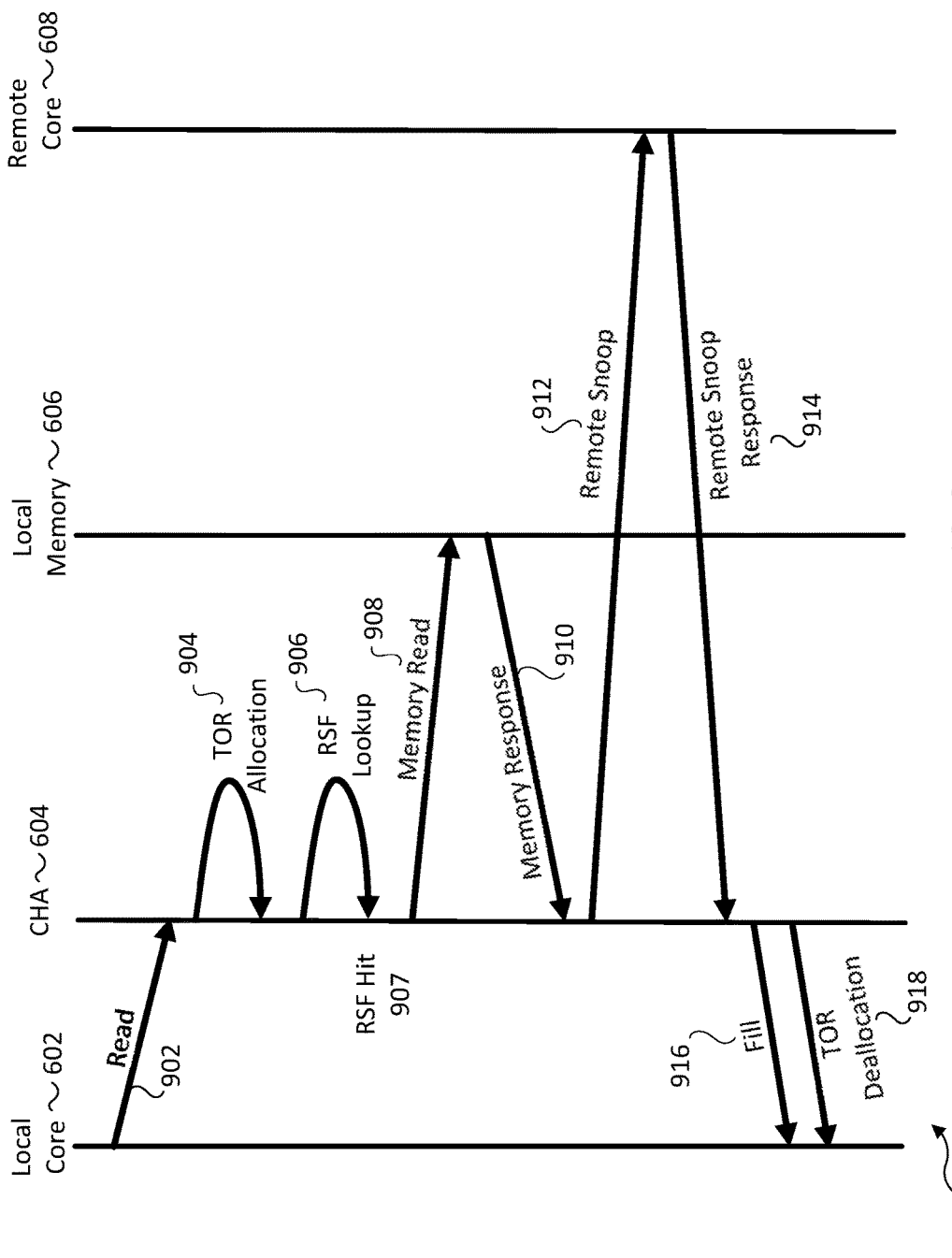
FIG. 9 illustrates a message flow diagram corresponding to cache line access request originating from local core in which the tracker entry in the TOR is not deallocated early according to an embodiment of the present invention.

FIG. 9 illustrates a message flow diagram 800 corresponding to cache line access request originating from local core 602 in which the tracker entry in the TOR is not deallocated early according to an embodiment of the present invention. Initially, the local core 602 sends to the CHA 604 a request, such as read request 902, to access a target cache line. Responsive to receiving the request, the CHA 604 allocates a tracker entry in the TOR to track the status of the request with TOR allocation message 904. Next the CHA 604 performs a RSF lookup 906 to search for an entry matching the target cache line. In this case, the RSF lookup results in RSF hit 807, indicating that the target cache line is cached in the core of at least one remote socket (e.g., remote core 608). Responsive to the RSF hit, the CHA 604 does not deallocate the tracker entry in the TOR. Instead, the CHA 604 dispatches a memory read message 908 to the local memory 606 to access the target cache line stored therein. In one embodiment, the memory read occurs after the RSF lookup. In other embodiments, the memory read is performed in parallel to the RSF lookup. As noted above, the timing and order between the RSF lookup and memory read are not critical to the underlying invention. In addition to the memory read 908, the CHA 604 also sends a remote snoop message 912 to the remote sockets that have a copy of the target cache line stored in their respective cache (e.g., remote core 608) as indicated by the RSF entry corresponding to the target cache line. According to an embodiment, the remote snoop may be conducted in parallel to the memory lookup 908. Upon receiving the memory response 910 from local memory 606 and remote snoop response 914 from remote core 608, respectively, the CHA 604 responds to the initial request 902 by sending the appropriate (e.g., most current) target cache line in a message 914 back to the local core 602. After responding to the initial request 902, the CHA 604 deallocates the tracker entry in the TOR via TOR deallocation message 918.

An embodiment of the present invention includes a system that has a plurality of processing units, each of which further includes one or more processing cores. The system also includes a memory that is coupled to and shared by the plurality of processing units, as well as a cache/home agent ("CHA") belonging to a first processing unit. The CHA is to maintain a remote snoop filter ("RSF") corresponding to the first processing unit to track cache lines such that a cache line is tracked by the RSF only if the cache line is stored in both the memory and one or more other processing units. The CHA is also to receive a request to access a target cache line from a processing core of the first processing unit, allocate a tracker entry corresponding to the request to track a status of the request; perform a lookup in the RSF for the target cache line; and deallocate the tracker entry responsive to a detection that the target cache line is not tracked by the RSF. The request to access a target cache line may be a read request. The tracker entry may be stored in a table of requests ("TOR"). The RSF tracks a first cache line by storing an entry corresponding to the first cache line in the RSF. Every entry in the RSF may include a physical address field to store a tracked cache line's physical address, a RESERVED bit to control access to the entry, and one or more VALID bits to indicate which of the plurality of processing units has a copy of the tracked cache line. The CHA may request the target cache line from the memory. In addition, the CHA may snoop the target cache line from one or more other processing units responsive to a detection that the target cache line is tracked by the RSF. Furthermore, the CHA may respond to the request by providing a copy of the target cache line to the processing core, such that the copy of the target cache line is read from either the memory or the one or more other processing units. Finally, responsive to the CHA responding to the request, the CHA may also deallocate the tracker entry. The deallocation of the tracker entry may include deleting the tracker entry from the TOR.

Another embodiment of the present invention is a method that includes: maintaining a remote snoop filter ("RSF") corresponding to a first processing unit of a plurality of processing units to track cache lines, receiving a request to access a target cache line from a processing core of the first processing unit, allocating a tracker entry corresponding to the request to track the status of the request, performing a lookup in the RSF for the target cache line, and deallocating the tracker entry in response to a detection that the target cache line is not tracked the RSF. According to the embodiment, a cache line is tracked by the RSF only if the cache line is stored in both a memory, which is coupled to and shared by the plurality of processing units, and one or more processing units other than the first processing unit. According to an embodiment, the request to access a target cache line may a read request and the tracker entry may be stored in a table of requests ("TOR"). Moreover, the RSF tracks a cache line by storing an entry corresponding to the cache line in the RSF. Each entry in the RSF may include a physical address field to store a tracked cache line's physical address, a RESERVED bit to control access to the entry, and one or more VALID bits to indicate which of the plurality of processing units has a copy of the tracked cache line. The method may further include requesting the target cache line from the memory, as well as snooping the target cache line from one or more processing units other than the first processing unit in response to a detection that the target cache line is tracked by the RSF. Moreover, the method may further include responding to the request by providing a copy of the target cache line to the processing core and then deallocating the tracker entry after responding to the request. The copy of the target cache line may be read from either the memory or the one or more other processing units. The deallocation of the tracker entry may include deleting the tracker entry from the TOR.

Yet another embodiment of the present invention includes a processor that is coupled to a memory and comprises one or more processor cores and a cache/home agent ("CHA"). The CHA of the processor is to maintain a remote snoop filter ("RSF") to track cache lines, wherein a cache line is only tracked by the RSF if the cache line is stored in both the memory and one or more other processors. In addition, the CHA is to receive a request to access a target cache line from one of the one or more processor cores, allocate a tracker entry corresponding to the request to track the status of the request, perform a lookup in the RSF for the target cache line, and then deallocate the tracker entry responsive to a detection that the target cache line is not tracked by the RSF. According to the embodiment, the request to access a target cache line may be a read request and the tracker entry may be stored in a table of requests ("TOR"). The RSF may track a first cache line by storing an entry corresponding to the first cache line in the RSF. Each entry in the RSF includes a physical address field to store a tracked cache line's physical address, a RESERVED bit to control access to the entry, and one or more VALID bits to indicate which of the one or more other processors has a copy of the tracked cache line. The CHA of the processor may further request the target cache line from the memory as well as snoop the target cache line from one or more other processors in response to a detection that the target cache line is tracked by the RSF. The CHA may also respond to the request by providing a copy of the target cache line to the processing core. The copy of the target cache line may be read from either the memory or the one or more other processors. Upon the CHA responding to the request, the CHA may deallocate the tracker entry which, in some cases, includes deleting the tracker entry from the TOR.

Figure 10:
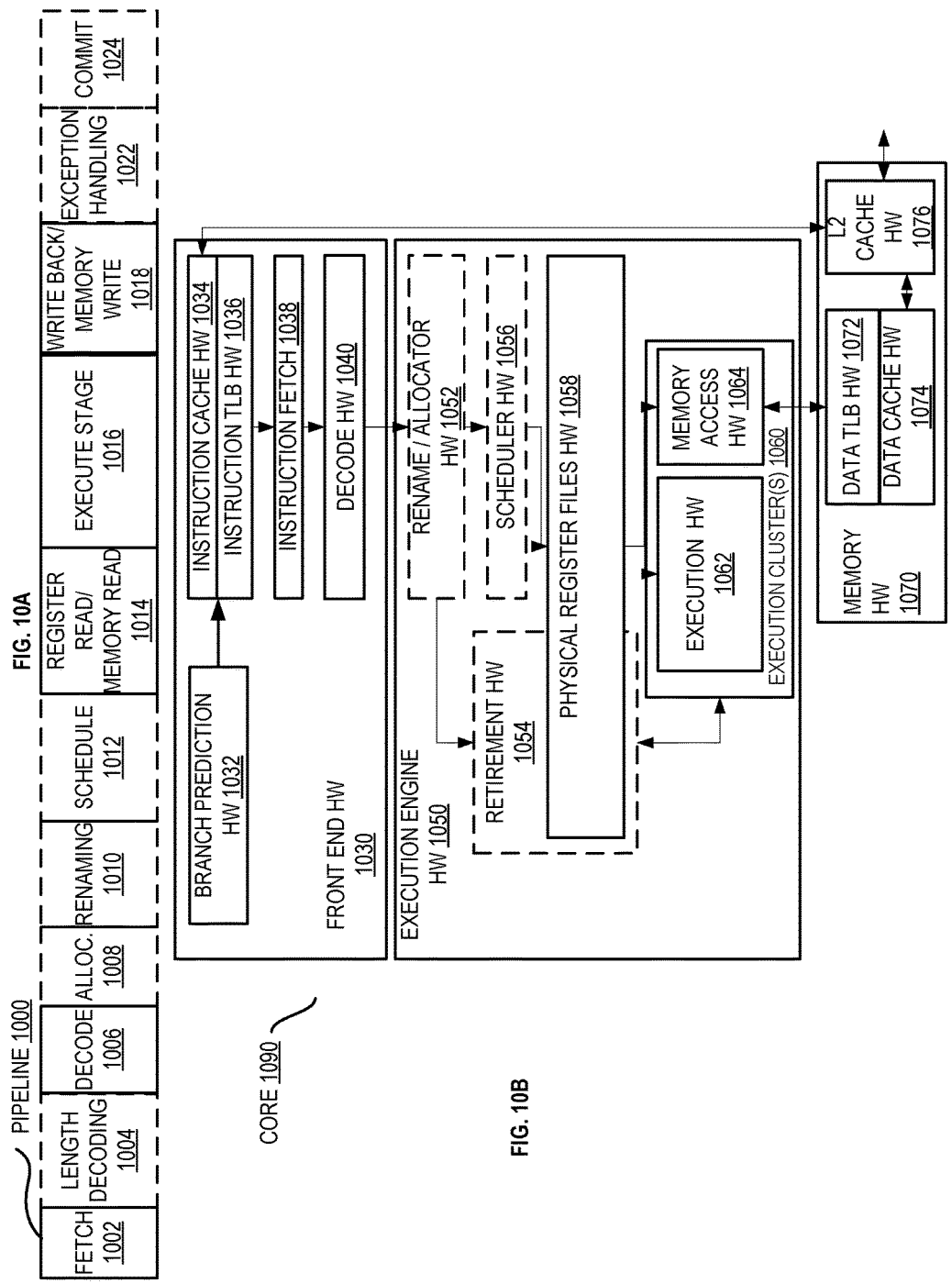
FIG. 10A is a block diagram illustrating both an exemplary in-order pipeline and an exemplary register renaming, out-of-order issue/execution pipeline according to embodiments of the invention.
FIG. 10B is a block diagram illustrating both an exemplary embodiment of an in-order architecture core and an exemplary register renaming, out-of-order issue/execution architecture core to be included in a processor according to embodiments of the invention.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end hardware 1030 coupled to an execution engine hardware 1050, and both are coupled to a memory hardware 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end hardware 1030 includes a branch prediction hardware 1032 coupled to an instruction cache hardware 1034, which is coupled to an instruction translation lookaside buffer (TLB) 1036, which is coupled to an instruction fetch hardware 1038, which is coupled to a decode hardware 1040. The decode hardware 1040 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode hardware 1040 or otherwise within the front end hardware 1030). The decode hardware 1040 is coupled to a rename/allocator hardware 1052 in the execution engine hardware 1050.

The execution engine hardware 1050 includes the rename/allocator hardware 1052 coupled to a retirement hardware 1054 and a set of one or more scheduler hardware 1056. The scheduler hardware 1056 represents any number of different schedulers, including reservations stations, central instruction window, etc. The scheduler hardware 1056 is coupled to the physical register file(s) hardware 1058. Each of the physical register file(s) hardware 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1058 comprises a vector registers hardware, a write mask registers hardware, and a scalar registers hardware. These register hardware may provide architectural vector registers, vector mask registers, and general purpose registers. The physical register file(s) hardware 1058 is overlapped by the retirement hardware 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1054 and the physical register file(s) hardware 1058 are coupled to the execution cluster(s) 1060. The execution cluster(s) 1060 includes a set of one or more execution hardware 1062 and a set of one or more memory access hardware 1064. The execution hardware 1062 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1056, physical register file(s) hardware 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1064). It should also be understood that where separate pipelines are used, one or more of these pipelines may be out-of-order issue/execution and the rest in-order.

The set of memory access hardware 1064 is coupled to the memory hardware 1070, which includes a data TLB hardware 1072 coupled to a data cache hardware 1074 coupled to a level 2 (L2) cache hardware 1076. In one exemplary embodiment, the memory access hardware 1064 may include a load hardware, a store address hardware, and a store data hardware, each of which is coupled to the data TLB hardware 1072 in the memory hardware 1070. The instruction cache hardware 1034 is further coupled to a level 2 (L2) cache hardware 1076 in the memory hardware 1070. The L2 cache hardware 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode hardware 1040 performs the decode stage 1006; 3) the rename/allocator hardware 1052 performs the allocation stage 1008 and renaming stage 1010; 4) the scheduler hardware 1056 performs the schedule stage 1012; 5) the physical register file(s) hardware 1058 and the memory hardware 1070 perform the register read/memory read stage 1014; the execution cluster 1060 perform the execute stage 1016; 6) the memory hardware 1070 and the physical register file(s) hardware 1058 perform the write back/memory write stage 1018; 7) various hardware may be involved in the exception handling stage 1022; and 8) the retirement hardware 1054 and the physical register file(s) hardware 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1034/1074 and a shared L2 cache hardware 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
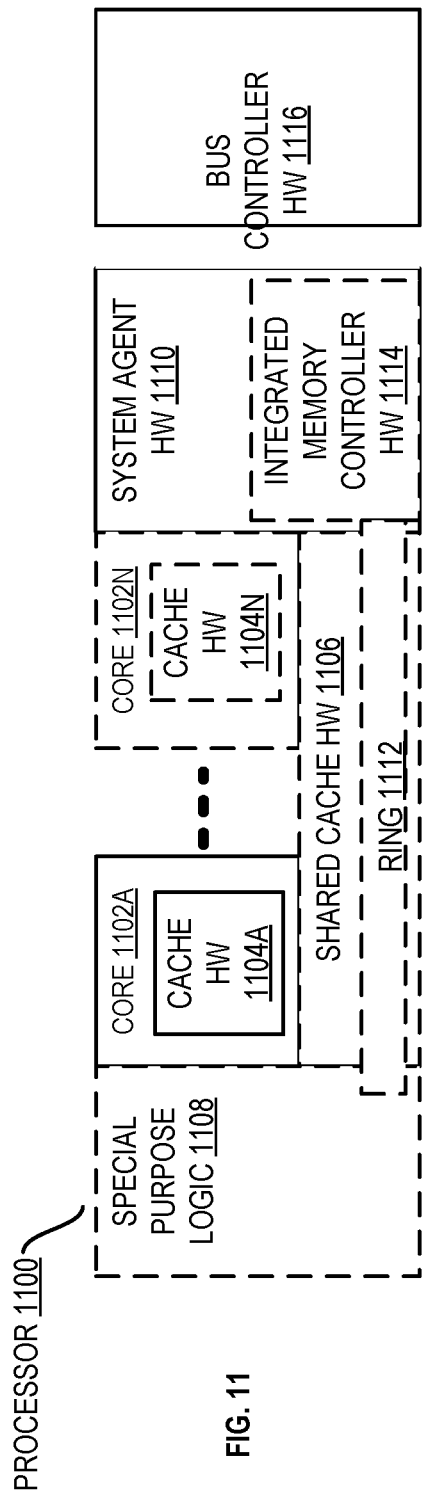
FIG. 11 is a block diagram of a single core processor and a multicore processor with integrated memory controller and graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller hardware 1116, while the optional addition of the dashed lined boxes illustrates an alternative processor 1100 with multiple cores 1102A-N, a set of one or more integrated memory controller hardware 1114 in the system agent hardware 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1106, and external memory (not shown) coupled to the set of integrated memory controller hardware 1114. The set of shared cache hardware 1106 may include one or more mid-level caches, such as level 2 (L2), level 3 (L3), level 4 (L4), or other levels of cache, a last level cache (LLC), and/or combinations thereof. While in one embodiment a ring based interconnect hardware 1112 interconnects the integrated graphics logic 1108, the set of shared cache hardware 1106, and the system agent hardware 1110/integrated memory controller hardware 1114, alternative embodiments may use any number of well-known techniques for interconnecting such hardware. In one embodiment, coherency is maintained between one or more cache hardware 1106 and cores 1102-A-N.

In some embodiments, one or more of the cores 1102A-N are capable of multi-threading. The system agent 1110 includes those components coordinating and operating cores 1102A-N. The system agent hardware 1110 may include for example a power control unit (PCU) and a display hardware. The PCU may be or include logic and components needed for regulating the power state of the cores 1102A-N and the integrated graphics logic 1108. The display hardware is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. In one embodiment, the cores 1102A-N are heterogeneous and include both the "small" cores and "big" cores described below.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
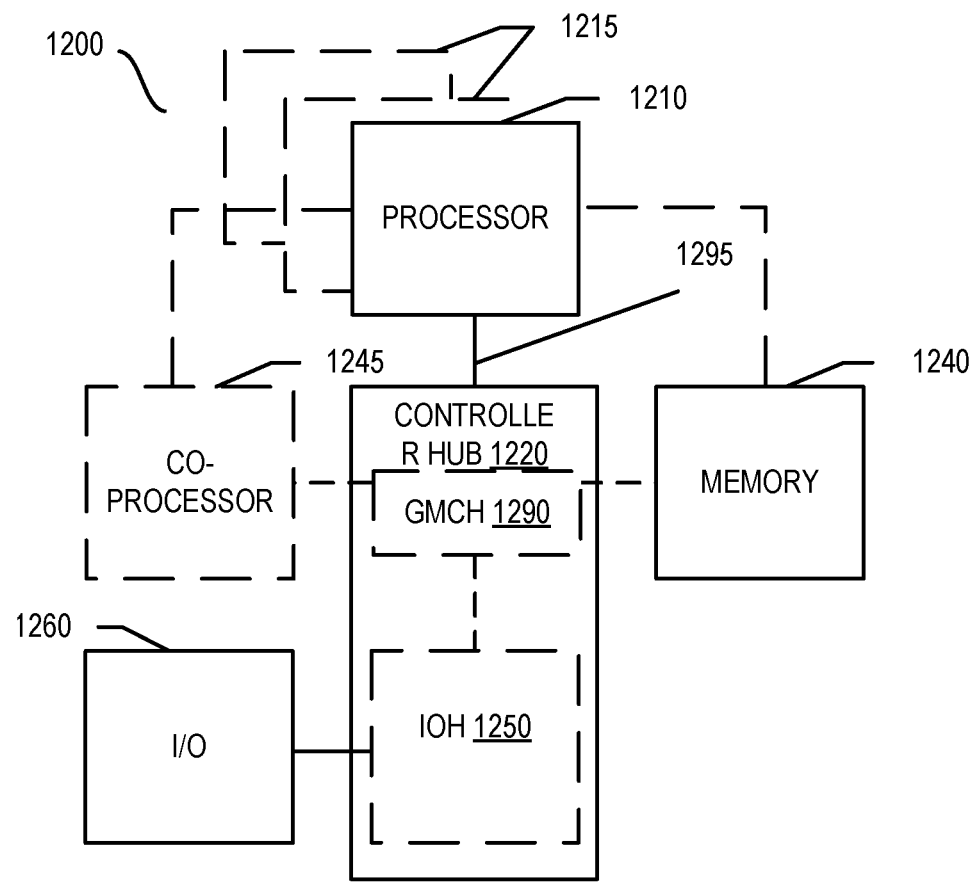
FIG. 12 illustrates a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
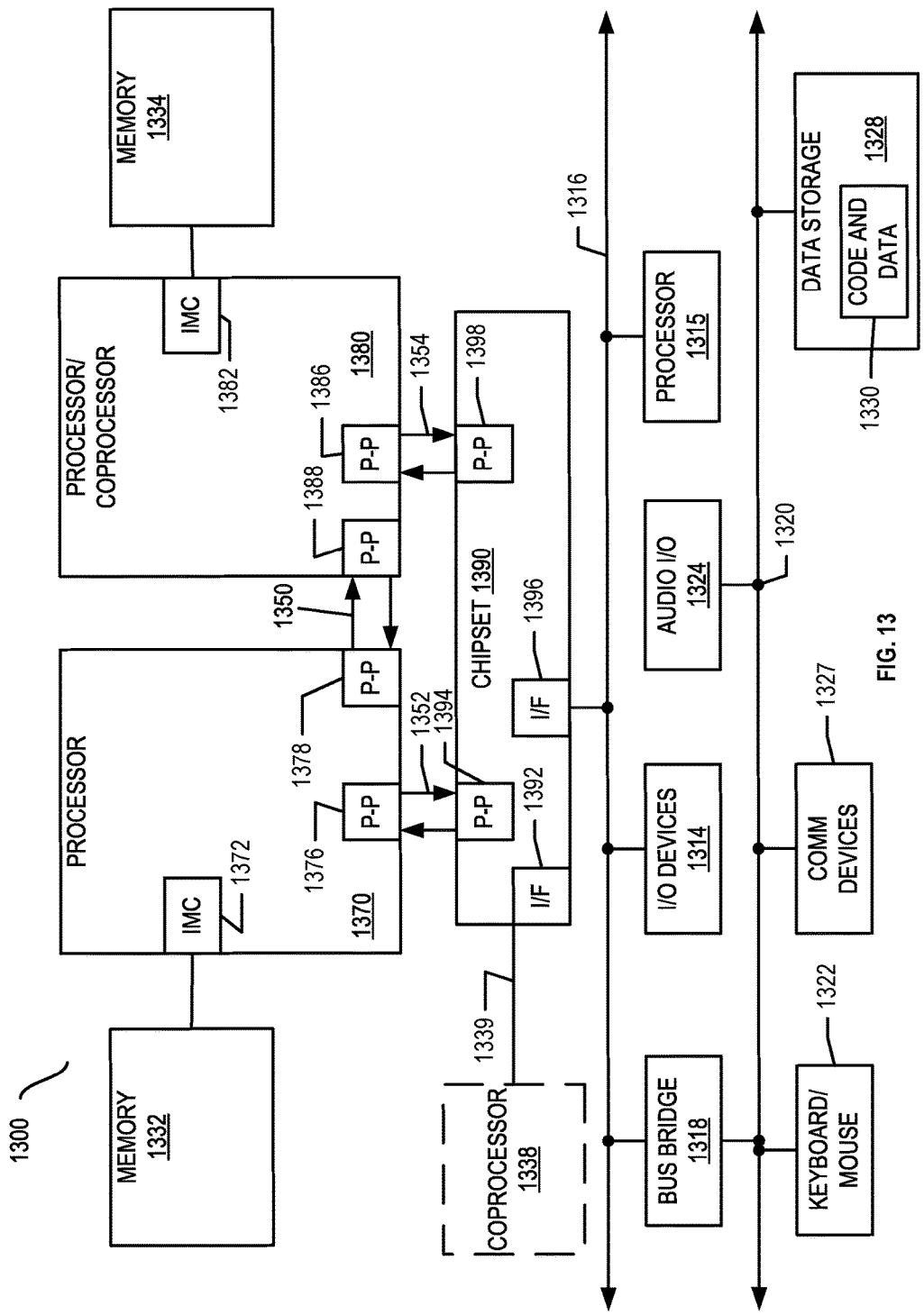
FIG. 13 illustrates a block diagram of a second system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) hardware 1372 and 1382, respectively. Processor 1370 also includes as part of its bus controller hardware point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) hardware), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage hardware 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
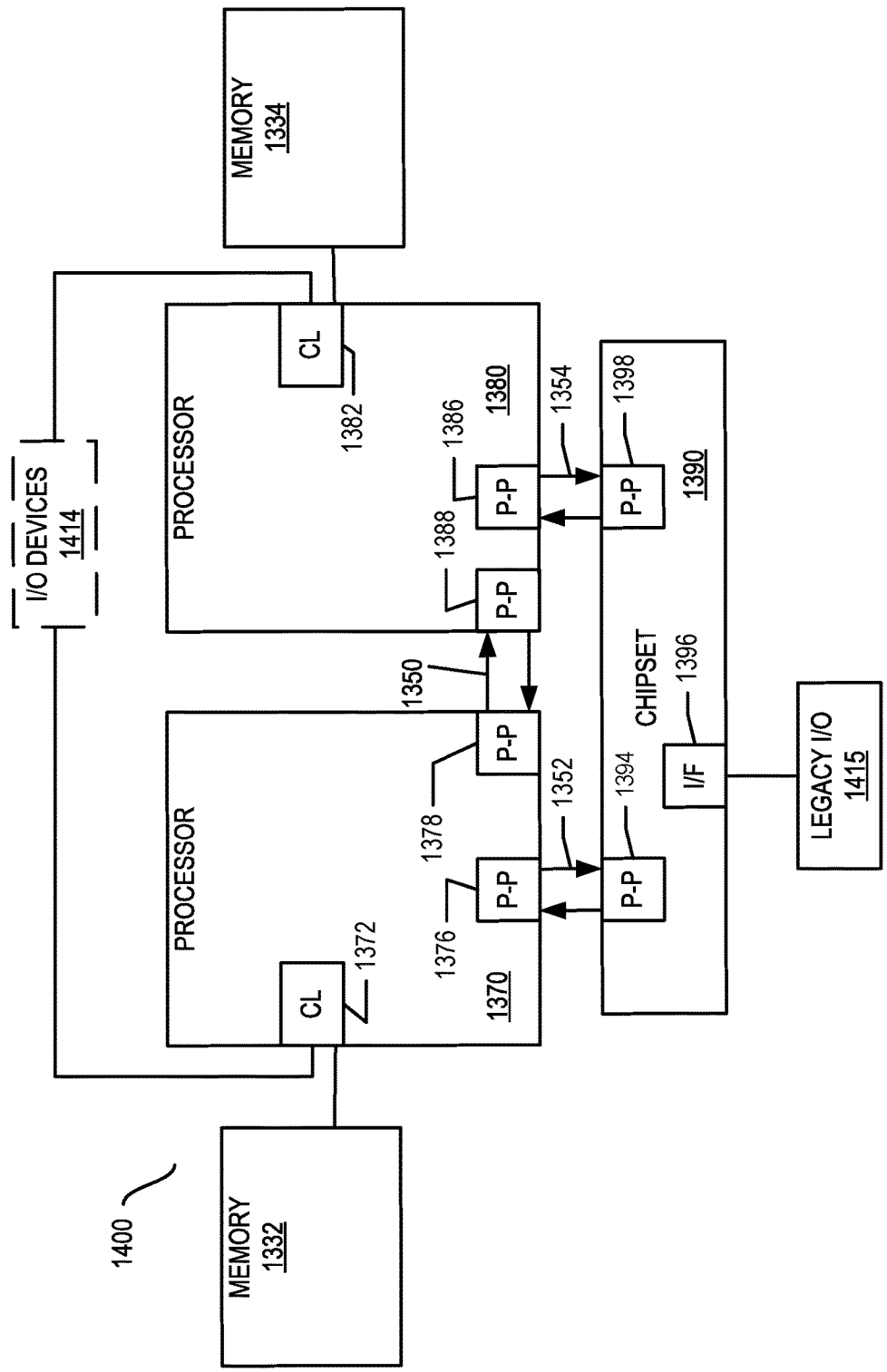
FIG. 14 illustrates a block diagram of a third system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller hardware and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
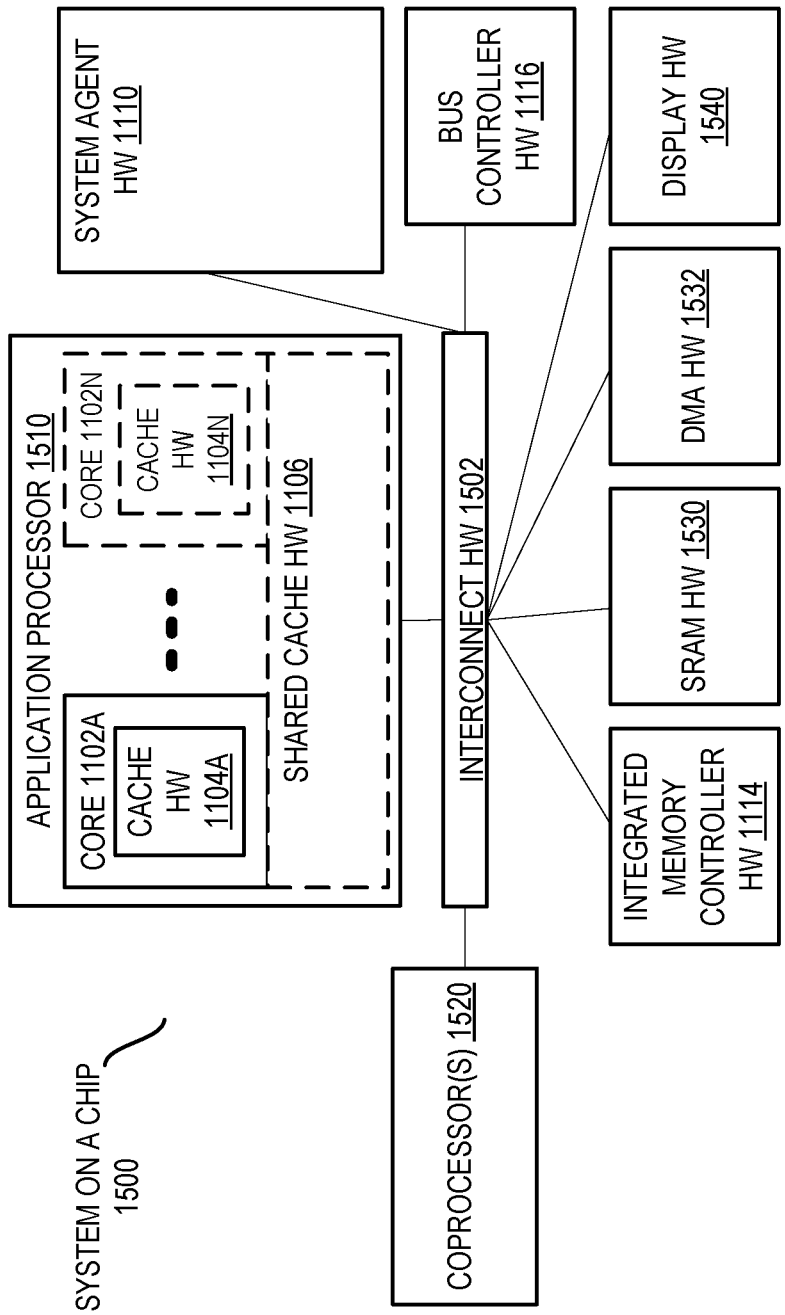
FIG. 15 illustrates a block diagram of a system on a chip (SoC) in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect hardware 1502 is coupled to: an application processor 1510 which includes a set of one or more cores 1102A-N and shared cache hardware 1106; a system agent hardware 1110; a bus controller hardware 1116; an integrated memory controller hardware 1114; a set or one or more coprocessors 1520 which may include integrated graphics logic, an image processor, an audio processor, and a video processor; an static random access memory (SRAM) hardware 1530; a direct memory access (DMA) hardware 1532; and a display hardware 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
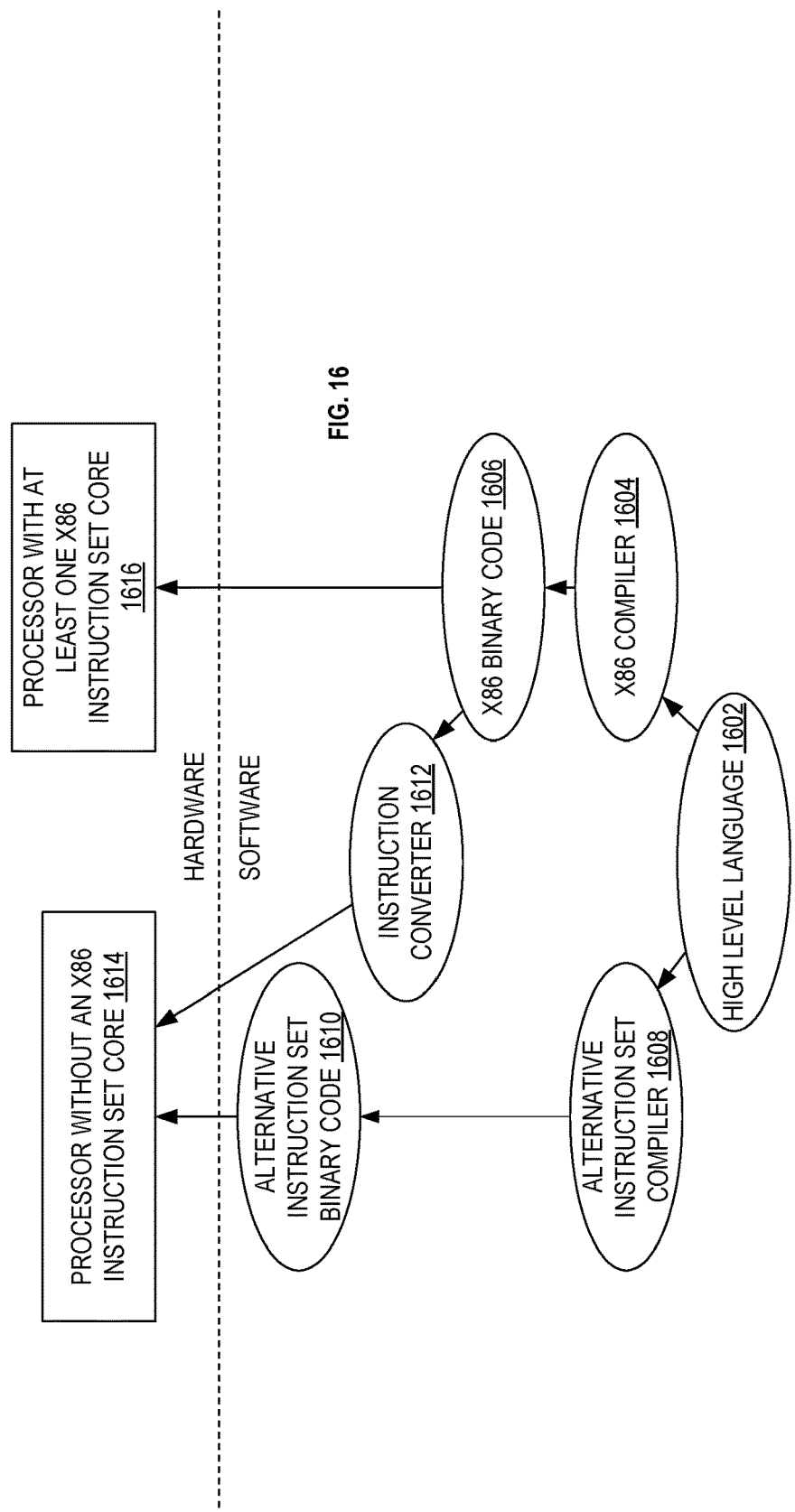
FIG. 16 illustrates a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A system comprising:
   a plurality of processing units, wherein each processing unit comprises one or more processing cores;
   a memory coupled to and shared by the plurality of processing units; and
   a cache/home agent ("CHA") of a first processing unit, the CHA to:
   maintain a remote snoop filter ("RSF") corresponding to the first processing unit to track cache lines, wherein a cache line is tracked by the RSF if the cache line is stored in both the memory and one or more other processing units;
   receive a request to access a target cache line from a processing core of the first processing unit;
   allocate a tracker entry corresponding to the request, the tracker entry used to track a status of the request;
   perform a lookup in the RSF for the target cache line; and
   deallocate the tracker entry responsive to a detection that the target cache line is not tracked by the RSF.

2. The system of claim 1, wherein the request to access a target cache line is a read request.

3. The system of claim 1, wherein the tracker entry is stored in a table of requests ("TOR").

4. The system of claim 1, wherein the RSF tracks a first cache line by storing an entry corresponding to the first cache line in the RSF.

5. The system of claim 1, wherein every entry in the RSF comprises:
   a physical address field to store a tracked cache line's physical address;
   a RESERVED bit to control access to the entry; and
   one or more VALID bits to indicate which of the plurality of processing units has a copy of the tracked cache line.

6. The system of claim 1, wherein the CHA is to request the target cache line from the memory.

7. The system of claim 1, wherein the CHA is to snoop the target cache line from one or more other processing units responsive to a detection that the target cache line is tracked by the RSF.

8. The system of claim 1, wherein the CHA is to respond to the request by providing a copy of the target cache line to the processing core, the copy of the target cache line is read from either the memory or the one or more other processing units.

9. The system of claim 8, wherein responsive to the CHA responding to the request, the CHA to deallocate the tracker entry.

10. The system of claim 9, wherein to deallocate the tracker entry comprises deleting the tracker entry.

11. A method comprising:
    maintaining a remote snoop filter ("RSF") corresponding to a first processing unit of a plurality of processing units to track cache lines, wherein a cache line is tracked by the RSF if the cache line is stored in both a memory and one or more other processing unit, the memory is coupled to and shared by the plurality of processing units;
    receiving a request to access a target cache line from a processing core of the first processing unit;
    allocating a tracker entry corresponding to the request, the tracker entry used to track a status of the request;
    performing a lookup in the RSF for the target cache line; and
    deallocating the tracker entry responsive to a detection that the target cache line is not tracked the RSF.

12. The method of claim 11, wherein the request to access a target cache line is a read request.

13. The method of claim 11, wherein the tracker entry is stored in a table of requests ("TOR").

14. The method of claim 11, wherein the RSF tracks a first cache line by storing an entry corresponding to the first cache line in the RSF.

15. The method of claim 11, wherein every entry in the RSF comprises:
 a physical address field to store a tracked cache line's physical address;
 a RESERVED bit to control access to the entry; and
 one or more VALID bits to indicate which of the plurality of processing units has a copy of the tracked cache line.

16. The method of claim 11, further comprises requesting the target cache line from the memory.

17. The method of claim 11, further comprises snooping the target cache line from one or more other processing units responsive to a detection that the target cache line is tracked by the RSF.

18. The method of claim 11, further comprises responding to the request by providing a copy of the target cache line to the processing core, the copy of the target cache line is read from either the memory or the one or more other processing units.

19. The method of claim 18, further comprises deallocating the tracker entry responsive to a response to the request.

20. The method of claim 19, wherein deallocating the tracker entry comprises deleting the tracker entry.

21. A processor coupled to a memory, the processor comprising:
 one or more processor cores; and
 a cache/home agent ("CHA"), the CHA to:
  maintain a remote snoop filter ("RSF") to track cache lines, wherein a cache line is tracked by the RSF if the cache line is stored in both the memory and one or more other processors;
  receive a request to access a target cache line from one of the one or more processor cores;
  allocate a tracker entry corresponding to the request, the tracker entry used to track a status of the request;
  perform a lookup in the RSF for the target cache line; and
  deallocate the tracker entry responsive to a detection that the target cache line is not tracked by the RSF.

22. The processor of claim 21, wherein the request to access a target cache line is a read request.

23. The processor of claim 21, wherein the tracker entry is stored in a table of requests ("TOR").

24. The processor of claim 21, wherein the RSF tracks a first cache line by storing an entry corresponding to the first cache line in the RSF.

25. The processor of claim 21, wherein every entry in the RSF comprises:
 a physical address field to store a tracked cache line's physical address;
 a RESERVED bit to control access to the entry; and
 one or more VALID bits to indicate which of the one or more other processors has a copy of the tracked cache line.

* * * * *